United States Patent
Zhang et al.

(10) Patent No.: US 6,720,074 B2
(45) Date of Patent: Apr. 13, 2004

(54) INSULATOR COATED MAGNETIC NANOPARTICULATE COMPOSITES WITH REDUCED CORE LOSS AND METHOD OF MANUFACTURE THEREOF

(75) Inventors: Yide Zhang, Storrs, CT (US); Shihe Wang, Amherstburg (CA); Danny Xiao, Willington, CT (US)

(73) Assignee: Inframat Corporation, Farmington, CT (US)

(*) Notice: Subject to any disclaimer, the term of this patent is extended or adjusted under 35 U.S.C. 154(b) by 0 days.

(21) Appl. No.: 10/046,337

(22) Filed: Oct. 26, 2001

(65) Prior Publication Data

US 2003/0129405 A1 Jul. 10, 2003

Related U.S. Application Data

(60) Provisional application No. 60/243,649, filed on Oct. 26, 2000.

(51) Int. Cl.[7] .................................................. G11B 5/16
(52) U.S. Cl. ................ 428/403; 428/404; 428/694 BA; 428/900; 427/216; 427/376.1; 427/376.2; 427/127
(58) Field of Search ................................ 428/403, 404, 428/694 BA, 900; 427/216, 376.1, 376.2, 127

(56) References Cited

U.S. PATENT DOCUMENTS

| | | |
|---|---|---|
| 5,230,729 A | 7/1993 | McCandlish et al. |
| 5,667,716 A * | 9/1997 | Ziolo et al. ............... 252/62.52 |
| 5,952,040 A * | 9/1999 | Yadav et al. ............. 427/126.3 |
| 6,045,925 A * | 4/2000 | Klabunde et al. .......... 428/548 |
| 6,048,920 A * | 4/2000 | Ziolo et al. .................. 524/435 |
| 6,162,530 A | 12/2000 | Xiao et al. |

OTHER PUBLICATIONS

Chatterjee et al "Glass–metal nanocomposite . . . " J. Phys. D: Appl. Phys. 22, 1386–1392, 1989.*
Leslie–Pelechy "Magnetic Properties of Nanostructured Materials" Chem. Mater. 8, 1770–1783, 1996.*
Heizer "Soft Magnetic Nanocrystalline Materials" Scripta Metallurgica et Materialia vol. 33 No's 10/11 1741–1756, 1995.*
Giri et al. "Coercivity of $Fe–SiO_2$ Nanocomposite materials . . . " J. Appl. Phys. 78(10), Nov. 1994.*
H. Gleiter, "Materials with Ultrafine Microstructures: Retrospective and Perspectives," NanoStructured Materials vol. 1, 1–19, 1992.
C.G. Granquist and R.A. Buhrman, "Ultrafine Metal Particles", Journal of Applied Physics, vol. 47, 2200–2219, 1976.

(List continued on next page.)

*Primary Examiner*—Leszek Kiliman
(74) *Attorney, Agent, or Firm*—Cantor Colburn LLP

(57) ABSTRACT

A series of bulk-size magnetic/insulating nanostructured composite soft magnetic materials with significantly reduced core loss and its manufacturing technology. This insulator coated magnetic nanostructured composite is comprises a magnetic constituent, which contains one or more magnetic components, and an insulating constituent. The magnetic constituent is nanometer scale particles (1–100 nm) coated by a thin-layered insulating phase (continuous phase). While the intergrain interaction between the immediate neighboring magnetic nanoparticles separated by the insulating phase (or coupled nanoparticles) provide the desired soft magnetic properties, the insulating material provides the much demanded high resistivity which significantly reduces the eddy current loss. The resulting material is a high performance magnetic nanostructured composite with reduced core loss.

14 Claims, 15 Drawing Sheets

OTHER PUBLICATIONS

M.L. Lau, et. al., "Synthesis of Nanocrystalline M50 Steel Powders by Cryomilling", NanoStructured Materials vol. 7, 847–856, 1996.

J.P. Partridge and P.R. Strutt, "Laser–Assisted Chemical and Morphological Modification of Metallic Substrates," SPIE 669, Laser Applications in Chemistry, 150–160, 1986.

T.D. Xiao, Y.D. Zhang, P.R. Strutt, J.I. Budnick, K. Mohan, and K.E. Gonsalves, "Synthesis of FexN/BN Magnetic Nanocomposite Via Chemical Processing," NanoStructured Materials, vol. 2, 285–294, 1993.

J. Smit and H.P.J. Wijn, Ferrites, (Philips', Holland, 1959).

P.R. Strutt, K.E. Gonsalves ans T.D. Xiao, "Synthesis of Polymerized Preceramic Nanoparticle Powders by Laser Irradiation of Metallorganic Precursors," NanoStructured Materials, vol. 1, 21–25, 1992.

T.D. Xiao, K.E. Gonsalves, P.R. Strutt and P.G. Klemens, "Synthesis of Si(N,C) Nanostructured Powders from an Organometallic Aerosol Using a Hot–Wall Reactor," Journal of Material Science 28, 1334–1340, 1993.

T.D. Xiao, S. Torban, P.R. Strutt and B. H. Kear, "Synthesis of Nanostructured Ni/Cr and Ni–Cr3C2 Powders by an Organic Solution Reaction Method," NanoStructured Materials, vol. 7, pp. 857–871, 1996.

T. D. Xiao, K.E. Gonsalves and P.R. Strutt, "Synthesis of Aluminum Nitride/Boron Nitride Composite Materials," J. Am. Ceram. Soc. 76, 987–92, 1993.

P. Luo, P.R. Strutt and T.D. Xiao, "Synthesis of Chromium Silicide–Silicon Carbide Composite Powder," Materials Science and Engineering, B17, 126–130, 1993.

T.D. Xiao, Bokhimi, Benaissa, R. Perez, P.R. Strutt and M. JoséYacamán, "Microstructural Characteristics of Chemically Processed Manganese Oxide Nanofibres," Acta. Mater. vol. 45, 1685–1693, 1997.

G.C. Hadjipanayis and G.A. Prinz, Science and Technology of Nanostructured Magnetic Materials, (Plenum Press, New York, 1991).

Y. Hayakawa, A. Makino, H. Fujimori and A. Inoue, "High resistive nanocrystalline Fe–M–O (M=Hf, Zr, rare–earth metals) soft magnetic films for high–frequency applications", J. Appl. Phys. 81, 3747–3752, 1997.

R.D. Shull et al., Nanocomposite Magnetic Materials, Proc. 6th Int. Cyrocooler Conf. (Eds: G. Green, M. Knox), David Taylor Research Center Publication #DTRC–91/002, Annapolis, MD 1991.

A.K. Giri, C. de Julian, and J.M. Gozalez, "Coercivity of Fe–SiO2 Nanocomposite Materials Prepared by Ball Milling", J. Appl. Phys. 76, 65736575, 1994.

A. Goldman, Handbook of Modern Ferromagnetic Materials, (Kluwer Academic Publisher, Boston, 1999).

K.H. Kim, Y.H. Kim, J. Kim, S.H. Han, and H.J. Kim, "The Magnetic Properties of Nanocrystalline Fe–Co(Cr)–Hf–N thin films", Journal of Applied Physics, vol. 87, 5248–5250, 2000.

W.D. Jones, Fundamental Principles of Powder Metallurgy, p. 659, (E. Arnold, London, 1960).

G. Herzer, Soft Magnetic Nanocrystalline Materials, Scripta Metallurgica et Materialia, vol. 33, 1741–1756, 1995.

D.L. Leslie–Pelecky, and R.D. Rieke, Magnetic Properties of Nanostructured Materials, Chem. Mater. 8, 1770–1783, 1996.

G. T. Rado, On the Inertia of Oscillating Ferromagnetic Domain Walls, Physical Review, vol. 83, pp. 821–826. 1951.

G.T. Rado, "Magnetic Spectra of Ferrites", Reviews of Modern Physics, vol. 25, pp. 81–89, 1953.

H. Fujimori, Structure and 100 MHz Soft Magnetic Properties in Multilayers and Granular Thin Films, Scripta Metallurgica et Materialia, vol. 33, 1625–1636, 1995.

A. Chatterjee et al., Glass–Metal Nanocomposite Synthesis by Metal Organic Route, J. Phys. D: Appl. Phys. 22, 1386–1392, 1989.

D. N. Lambeth, et al., "Media for 10Gb/in2 Hard Disk Storage, Issues and Status", J. Appl. Phys. 79, 4496–4501, 1996.

Djega–Mariadassou, et al; "High Field Magnetic Study of Small Fe Particles Dispersed in an Alumina Matrix"; IEEE Transactions on Magnetics, vol. 26, No. 5, Sep. 1990.

Pardavi–Horvath, et al; "Switching Field Distribution Changes During Reactions–Milling of Iron–Zinc Nanocomposites", IEEE Transactions on Magnetics, vol. 31, No. 6, Nov. 1995.

Laurent, et al; "Magnetic Properties of Granular Co–Polymer Thin Films"; J. Appl.Phys. 65 (5), Mar. 1, 1989.

Niklasson, et al, "Optical Properties and Solar Selectivity of Coevaporated Co–Al$_2$O$_3$ Composite Films", J. Appl. Phys. 55 (9), May 1, 1984.

Gavin, et. al, "Fabrication and Magnetic Properties of Granular Alloys"; J. Appl. Phys. 67 (2), Jan. 15, 1990.

Paparazzo, et. al, "X–Ray Photoemission Study of Fe–Al$_2$O$_3$ Granular Thin Films"; Rapid Communications Physical Review B vol. 28, No. 2, Jul. 15, 1983.

Gittleman, et al, "Electric–Field–Induced g Shifts And . . . Magnetic Properties of Granular Nickel Films"; Physical Review B vol. 5, No. 9, May 1, 1972.

Gittleman, et. al, "Superparamagnetism and Relaxation Effects in Granular Ni–SiO$_2$ and Ni–AL$_2$O$_3$ Films"; Physical Review B, vol. 9, No. 9.

Pardavi–Horvath, et. Al, "Magnetic Properties of Copper–Magnetic Nanocomposites Prepared by Ball Milling"; J. Appl. Phys, 73 (10), May 15, 1993.

Nickels, et. Al. "Protection of Fe Pigments with Amine–Quinone Polymers"; IEEE Transactions on Magnetics, vol. 30, No. 6, Nov. 1994.

Wang, et. Al, "Preparation and Magnetic properties of Fe$_{100\alpha}$Ni$_x$_SiO$_2$ Granular Alloy Solid Using a Sol–Gel Method"; Journal of Magnetism and Magnetic Materials 135, 1994.

Leslie–Pelecky, et. Al, "Self–Stabilized Magnetic Colloids: Ultrafine Co Particles in Polymers"; J. Appl. Phys. 79 (8), Apr. 15, 1996.

* cited by examiner

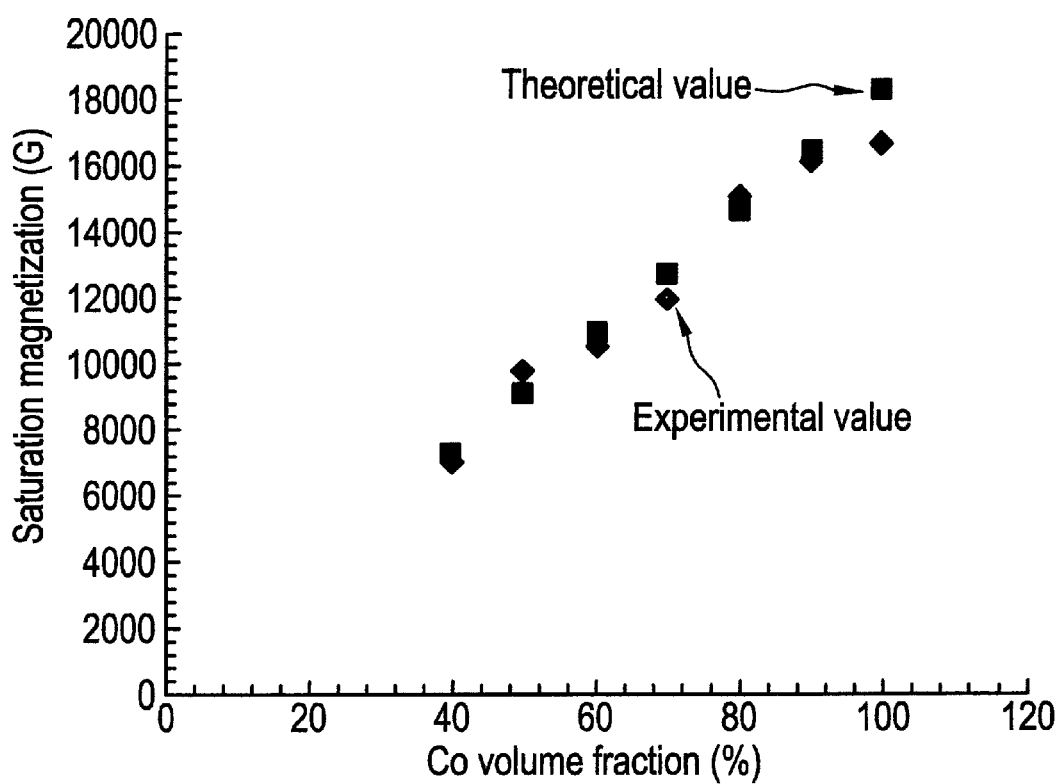

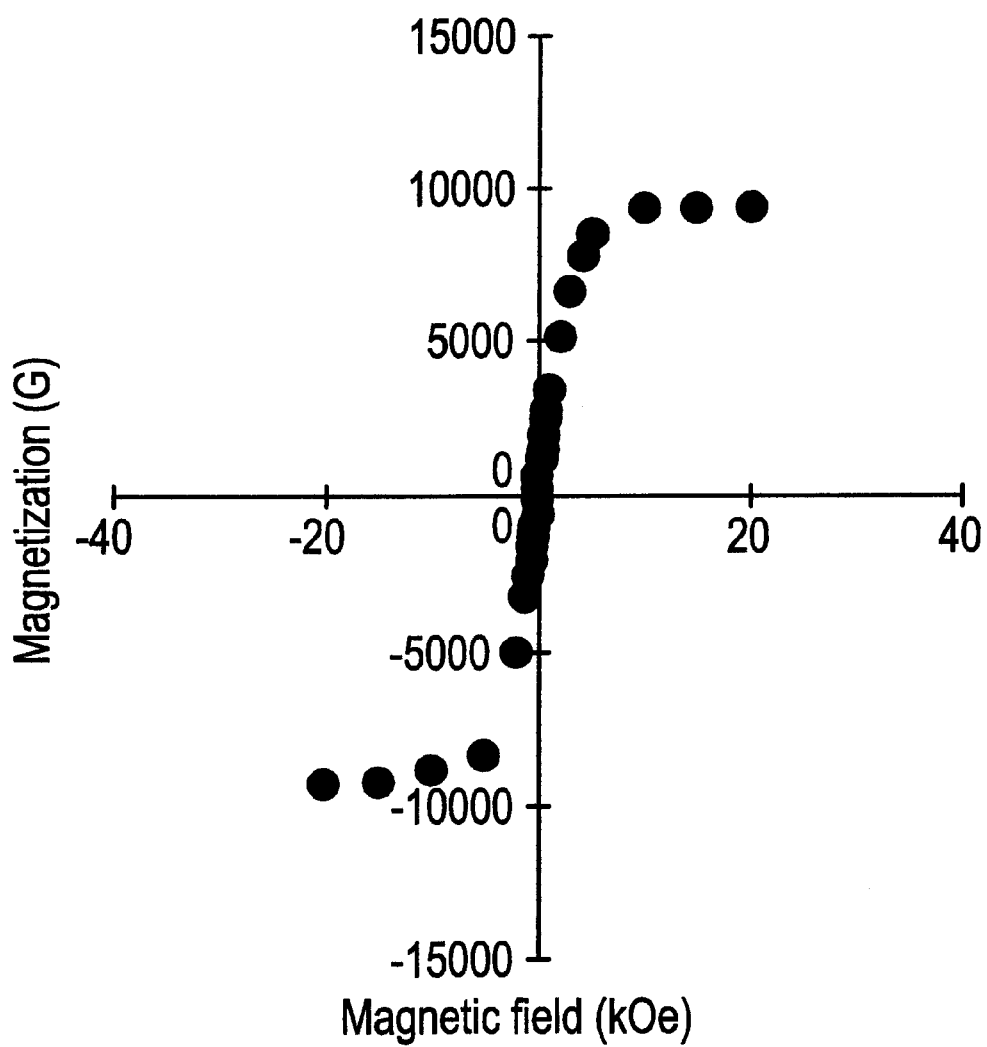

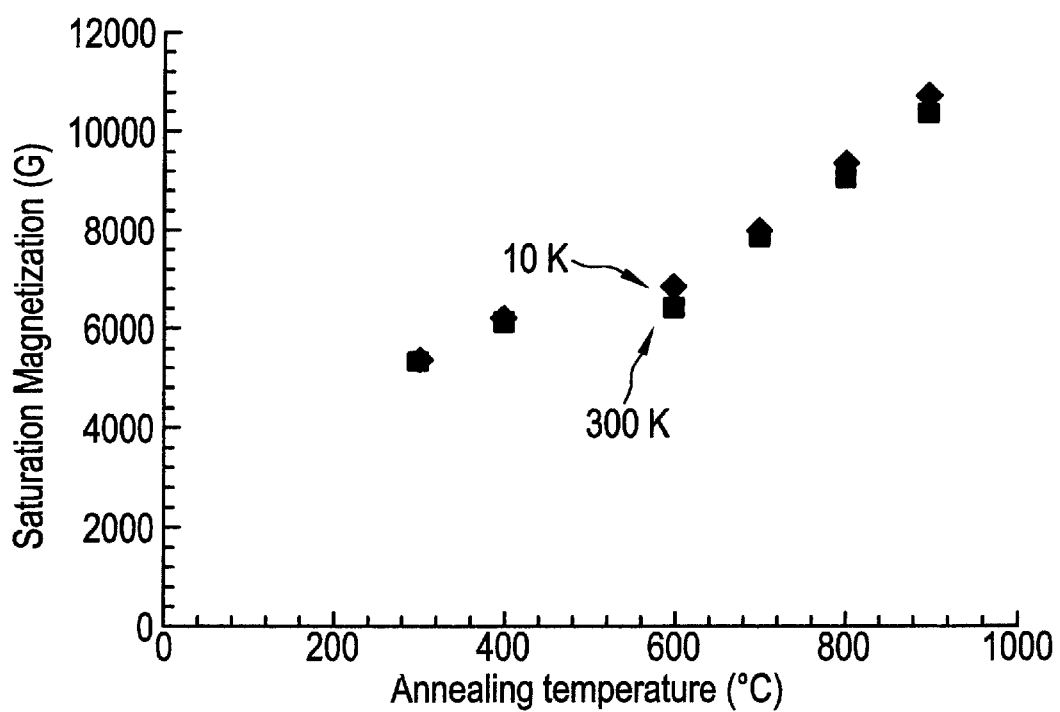

INSULATOR COATED MAGNETIC NANOPARTICULATE COMPOSITES WITH REDUCED CORE LOSS AND METHOD OF MANUFACTURE THEREOF

CROSS REFERENCE TO RELATED APPLICATION

This application claims the benefits of U.S. Provisional Patent Application Serial No. 60/243,649 filed Oct. 26, 2000, which is fully incorporated herein by reference.

Statement Regarding Federally Sponsored Research & Development The U.S. Government has certain rights in this invention pursuant to NASA contract No. NAS 3 00073.

BACKGROUND OF THE INVENTION

The present disclosure relates to magnetic materials, and in particular to soft magnetic materials useful as core materials of inductive components.

The inductive components used in electronics and electronic devices require use of magnetic materials. Ideal magnetic materials for inductive components possess high saturation magnetization, high initial permeability, high resistivity, low magnetic power loss, low eddy current loss, low dielectric power loss, high Curie temperature, stable magnetic and electrical properties over a range of temperatures, good mechanical strength.

To date, high frequency magnetic components use ferrites as core materials, which have been in use for more than five decades. However, ferrites possess several major disadvantages, including low permeability when compared to metallic materials, poor performance at frequencies of greater than 100 MHz, low Curie temperature, and complex manufacturing procedures. Currently, there is no method available for producing soft magnetic materials with properties superior to ferrites in the high frequency range (greater than 100 MHz), that are also capable of being manufactured in bulk quantity.

Current methods for processing conventional micrometer-sized soft magnetic materials are designed to reduce the total core loss by reducing eddy current loss. Three types of soft magnetic materials are presently used: metallic ribbons, powdered metals, and powdered ferrites. Metallic ribbon materials comprise Fe—Ni, Fe—Co, and Fe—Si alloys, manufactured in the form of stripes or ribbons using a metallic metallurgy approach. These metallic alloys are used in the frequency range of 10 to 100 kHz.

Powdered metal materials are composites consisting of a metallic magnetic phase (Fe, Co or their alloys) and a nonmagnetic insulating phase. This type of material is made by powder metallic metallurgy techniques. Powder materials are used in the frequency range of 50 kHz to 500 kHz.

Ferrites include materials such as spinel ferrites (e.g., (Ni, Zn)$Fe_2O_4$ or (Ni,Zn)$Fe_2O_4$), hexagonal ferrites (e.g., $Me_2Z$, wherein Z=$Ba_3Me_2Fe_{24}O$, and Me denotes a transition metal element), and garnet ferrites (e.g., $Y_3Fe_5O_{12}$). Ferrites are made by ceramic processing, and are used in the frequency range from 100 kHz to 100 GHz.

There are a number of disadvantages associated with use of the currently available soft magnetic materials. In conventional micrometer-sized magnetic materials, each particle possesses many magnetic domains (or multidomains), which cause interference or resonance. Domain wall resonance restricts the frequency characteristics of the initial permeability. When the size of the magnetic particle is smaller than the critical size for multidomain formation, the particle is in a single domain state. Domain wall resonance is avoided, and the material can work at higher frequencies.

None of the three types of magnetic materials meet all of the above-mentioned requirements in soft magnetic applications due to their associated large core loss. Metallic magnetic alloy ribbons have excellent fundamental magnetic properties such as high saturation magnetization, low intrinsic, high initial permeability, and high Curie temperature. However, their extremely low resistivity ($10^{-6}$ Ohm-cm) makes them difficult to be use beyond 1 MHz. In addition, the mechanical strength of the ribbons is very poor. Powder materials have higher resistivity and, consequently, can be used at higher frequency range, but their permeability is low. Ferrites are the only practical choice when the working frequency for a device is beyond 1 MHz, but the magnetic properties of ferrites in high frequency range are actually poor. Although extensive efforts have been directed to improving the performance of these materials, very limited progress was obtained.

To date, there appears to be no prior art relating to the use of a nanostructured materials in bulk soft magnetic applications. As used herein, nanostructured materials have ultrafine grains or particles of less than 100 nanometers (nm). A feature of nanostructured materials is the high fraction of atoms (up to 50%) that reside at grain or particle boundaries. Such materials have substantially different, very often superior, chemical and physical properties compared to conventional micrometer-sized grain counterparts having the same composition.

A variety of methods have been developed to produce nanostructured particulate materials, for example production by condensation from the vapor phase. This inert gas condensation methodology has been scaled-up by Nanophase Technologies to produce n-$TiO_2$ and $Al_2O_3$ in commercial quantities. Another technique for making nanostructured metal and ceramic powders is by mechanical milling at ambient or at liquid nitrogen (cryomilling) temperature. A third approach is chemical synthesis from inorganic or organic precursors, which has been used to produce nanostructured WC/C.

Recently, nanostructured FeMO (wherein M is Hf, Zr, Si, Al or rare-earth metal element) thin films have been obtained by Hadjipanayis et al, and Hayakawa et al, via atomic deposition. These are nanostructured composite thin films deposited on substrates, and the thin film is composed of nanostructured magnetic particles surrounded by an amorphous insulating phase. However, the atomic deposition approach is limited to thin film application, and is not suitable for bulk materials.

Fe/silica nanostructured composites have been proposed for use in magnetic refrigeration application. The nanostructured composites are a mixture of iron particles with silica ceramic, but such composites are limited to magnetic refrigeration, and cannot be used for high frequency magnetic applications. The synthesis of magnetic nanostructured composites using a wet chemical synthesis technique has been described, wherein a $Fe_n$/BN nanostructured composite was prepared by the ammonolysis of an aqueous mixture solution of $FeCl_3$, urea, and boric acid, followed by the thermochemical conversion. While the synthesis of other magnetic nanostructured composite systems have been described, none of these materials is suitable for high frequency soft magnetic applications for reduced core loss. There accordingly remains a need in the art for compositions and methods for bulk manufacture of soft magnetic materials, especially bulk materials useful above about 1 MHz.

SUMMARY OF THE INVENTION

The above-described drawbacks and disadvantages are overcome or alleviated by a magnet/insulator nanostructured composite material comprising nanostructured magnetic particles embedded in an insulating matrix.

A method to manufacture such materials comprises fabricating a precomposite from a precursor composition; forming magnetic nanostructured particles surrounded by a dielectric layer from a precomposite; and passivating the surface of the surrounded nanostructured particles.

A method for forming a consolidated bulk magnetic/insulator nanostructured composite comprises preparing a ready-to-press nanostructured composite powders comprising a nanostructured metal core and a dielectric layer; consolidating the ready-to-press powder into a green compact; shaping the green compact; and annealing the shaped compact.

BRIEF DESCRIPTION OF THE DRAWINGS

FIG. 8 is a graph showing saturation magnetization of $n-Co_x/(SiO_2)_{100-x}$ as a function of Co volume fraction x (diamonds) compared with the theoretical values (squares).

FIG. 9 is a graph showing room temperature hysteresis loop of $n-Co/SiO_2$ annealed at 700° C. in hydrogen.

FIG. 10 is a plot of saturation magnetization as a function of hydrogen annealing temperature.

DETAILED DESCRIPTION OF THE PREFERRED EMBODIMENTS

Figure 1:
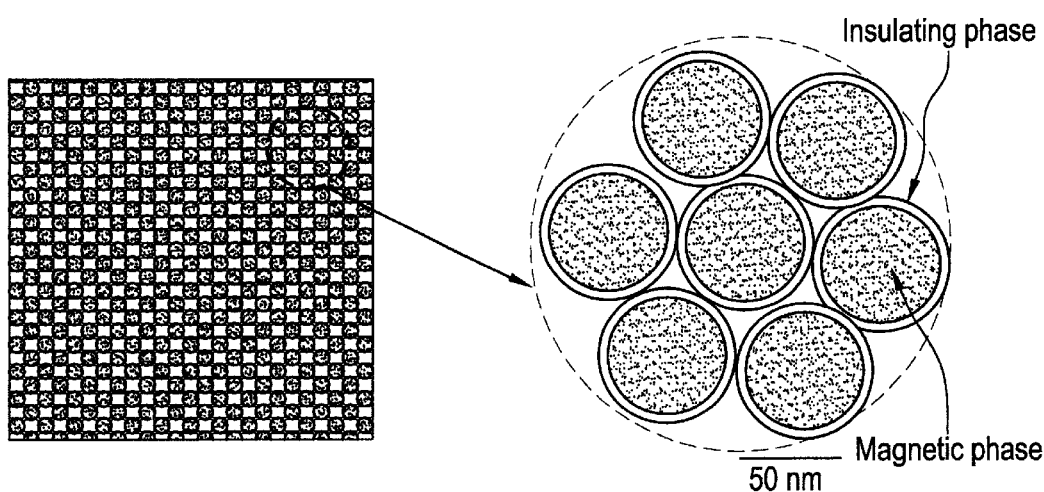
FIG. 1 is a schematic diagram illustrating a method for the manufacture of metal/insulator nanostructured composite materials.

A novel magnet/insulator nanostructured composite material comprises nanostructured magnetic particles embedded in an insulating material as shown in FIG. 1. Specifically, magnetic particles with maximum diameters between 1 to 100 nm are embedded in an insulating constituent such that the magnetic particle—particle separation is between 1 and 100 nm. In part because nanostructured materials are constructed of nanometer-sized building blocks, which are on the order of 1000 times smaller than the volume of traditional bulk materials, replacing commercially used ferrite cores with these high performance magnetic nanostructured composites results in inductive components that are lighter, smaller, economical, and highly durable, contributing greatly to improved performance in high frequency devices, as well as in microwave antenna and rectenna applications. The materials furthermore have a more uniform mechanical structure, with high strength, ductility and hardness, larger resistance to fracture, deformation, wear, and corrosion.

Suitable soft magnetic materials include but are not limited to compositions having at least one magnetic component, for example transition metals such as Fe, Co, Ni, Mn, and Zn; transition metal intermetallic alloys such as Fe—Ni, Fe—Co, Co—Ni, Fe—B, Fe—N, Fe—Zr, Fe—Si, Fe—Si—B, Fe—Zr—B, Fe—P—B, and Mn—Zn; and transition metal-rare earth alloys, such as Fe—Nb, Fe—Sm, and the like. Suitable insulating phase materials are high dielectric materials, including amorphous or crystalline ceramics such as alumina, silica, zirconia, and the like, and high dielectric polymers and polymer composites. The insulating phase components can be either nonmagnetic or magnetic (such as ferrite) materials.

In a particularly advantageous feature, such materials may be manufactured in the bulk phase in large quantities. In accordance with the method, nanostructured particles are synthesized from precursors, and coated with an insulating layer, then consolidated into bulk-size magnetic components. This method provides the opportunity for very large quantity production, as well as access to different shapes such as toroidol, plate, bead, rod, and the like.

Coating may be conveniently accomplished using an aqueous solution reaction of metal and ceramic precursors. An apparatus suitable to produce the nanostructured composite powders includes a reaction vessel equipped with a pH meter, temperature controller, hot plates and/or spray drier. Suitable process steps for the synthesis of metal/insulator nanostructured composite include precursor preparation; precomposite fabrication; nanostructured composite formation; and surface passivation.

Use of precursors allows uniform mixing of the constituent elements at the molecular level. Low temperature annealing of the precursors facilitates the formation of a thin, insulating layer coated on the surfaces of magnetic particles. Specific aspects of this process are (1) the addition of a glucose diluent in the precursor preparation step, (2) formation of a precomposite, (3) controlling of particle size of the magnetic phase at elevated temperature synthesis in a gaseous environment, and (4) formation of an amorphous layer at the magnetic particle surface. The material then has no overall electric conductivity, and the eddy current produced within the particle is extremely small at high frequency up to GHz frequency band.

Consolidation is conveniently accomplished using known powder metallurgy processing techniques and apparatus, for example ball mills or powder mixers, forming dies, presses, and high temperature sintering furnaces. Suitable process steps for the formation of consolidated bulk magnetic/insulator nanostructured composites are preparation of ready-to-press powders; consolidation of the ready-to-press powder into a green compact; component shape fabrication; and low temperature annealing.

Using this process, Co/SiO$_2$ and Fe—Ni/SiO$_2$ nanostructured composite systems with various volume fractions of the Co and Fe—Ni with respect to SiO$_2$ have been manufactured. Co/polymer, Fe/NiFe$_2$O$_4$, and Fe/SiO$_2$ nanocomposite materials have also been synthesized using chemical approaches. These nanostructured composite have been thoroughly characterized and consolidated into toroidal cores.

The magnetic/insulating nanostructured composites are suitable for use in many fields where conventional soft magnetic materials are currently used. In particular, the following soft magnetic materials application categories are especially desirable: (i) power applications, for example high power applications such as power transformers, pulse transformers, filters, and chocks, as well as low power applications such as inductors and linear transformers; (ii) linear applications, (iii) microwave applications, such as antenna, rectenna, circular; (iii) magnetic fluids; and (iv) refrigeration applications.

Without being bound by theory, it is hypothesized that the magnetic/insulator nanostructured composites take advantage of exchange coupling, a quantum mechanical effect that takes place only in nanostructured magnetic particles. With the new interaction, the materials possess novel magnetic properties. Because they consist of two or more constituents, there are more degrees of freedom available to independently adjust the magnetic, electric, thermal and mechanical properties of the materials. The as-formed nanostructured composite system can therefore be adjusted to be electrically insulating without changing its magnetic behavior. Another advantage of the method is that compared to the traditional metallurgical processing, which involve melting, rolling, cutting, wrapping and heat treatment, the present self-assembly and final shape formation procedures used for the fabrication of the nanostructured composite components are more economical.

The invention is further illustrated by the following non-limiting examples.

EXAMPLES

Synthesis of Co/SiO$_2$ (50:50 Volume %) Nanostructured Composite Powders.

A typical recipe for Co (50 vol. %)-SiO$_2$ (50 vol. %) composite is: 16.0 g tetraethoxysilane (TEOS, (C$_2$H$_5$O)4Si), 64.2 g cobalt acetate (Co(OOCCH$_3$) 2.2H$_2$O), 40.0 g glucose (C$_6$H$_{12}$O$_6$), and 160 ml ethanol.

Precursor preparation: Tetraethoxysilane, cobalt acetate, and glucose were dissolved in ethanol. This solution is stirred (about 5 hours) to obtain a homogenous solution mixture.

Precomposite powder preparation: The precursor solution then is converted into a precomposite powder using an evaporation method. This was accomplished by heating the precursor solution to 120–150° C. with vigorous stirring to prevent precipitation of any elements. In large-scale quantity production, this step may be accomplished by a spray conversion technique using a spray dryer.

Conversion of the precomposite into Co/SiO$_2$ nanostructured composite: The precomposite powder was then transferred to an environmental furnace (modified Thermolyne). The powder was first heated to 500° C. in open air for 0.5 hours. The purpose of this heat treatment is to burn off excess carbon in the precomposite powder. After the reaction, Co and Si existed in the form of amorphous oxides, namely, CoO and SiO$_2$. The oxide forms of the precomposite were then converted into a Co/SiO$_2$ nanostructured composite under a reducing atmosphere in H2. In the actual experiments, the system was then purged and H$_2$ gas was introduced after the oxidation reaction at 500° C. The conversion experiments were performed at various temperatures from 300–900° C. for 5 h (H$_2$ flow of 2 liters/min). All these temperatures produced Co/SiO$_2$ nanostructured composite powders. It was found that the annealing temperature is an important factor in determining the magnetic properties of the n-Co/SiO$_2$ system.

Surface passivation: Although the Co nanostructured particles are coated with a thin film of SiO$_2$, the SiO$_2$ film is very porous, which permits the diffusion of oxygen molecules into the surface of Co. The synthetic Co/SiO$_2$ is extremely pyrophoric due to its nanostructured nature, and will spontaneously burn to form oxide powders when exposed to air. To overcome this problem, the particle surface is passivated after the hydrogen reduction is complete. In one approach, the system is purged with N$_2$ gas for 20 minutes to de-activate the Co surface. The system was then cooled down in N$_2$. Before exposure to air, droplets of mineral oil were sprinkled onto the powder surface and allowed enough time for oil diffusion, while the reactor was purged with N$_2$. Excess oil was then washed off with hexane.

Synthesis of Co/SiO$_2$ Nanostructured Composite Powders with Varying Co Volume Fraction.

Using the same procedure described in example 1, Co/SiO$_2$ nanostructured composites was made having varying Co volume fractions. All of the operation procedure the same, except the cobalt acetate to tetraethoxysilane ratios were varied to obtain 40 vol %, 60 vol %, 70 vol %, 80 vol %, and 90 vol % of Co in Co/SiO$_2$ nanostructured composites, by adjusting the cobalt acetate to tetraethoxysilane ratios respectively.

Property Evaluations of Co/SiO$_2$ Nanostructured Composite Powders.

A. Structural Properties of n-Co/SiO$_2$ Powder

Figure 2:
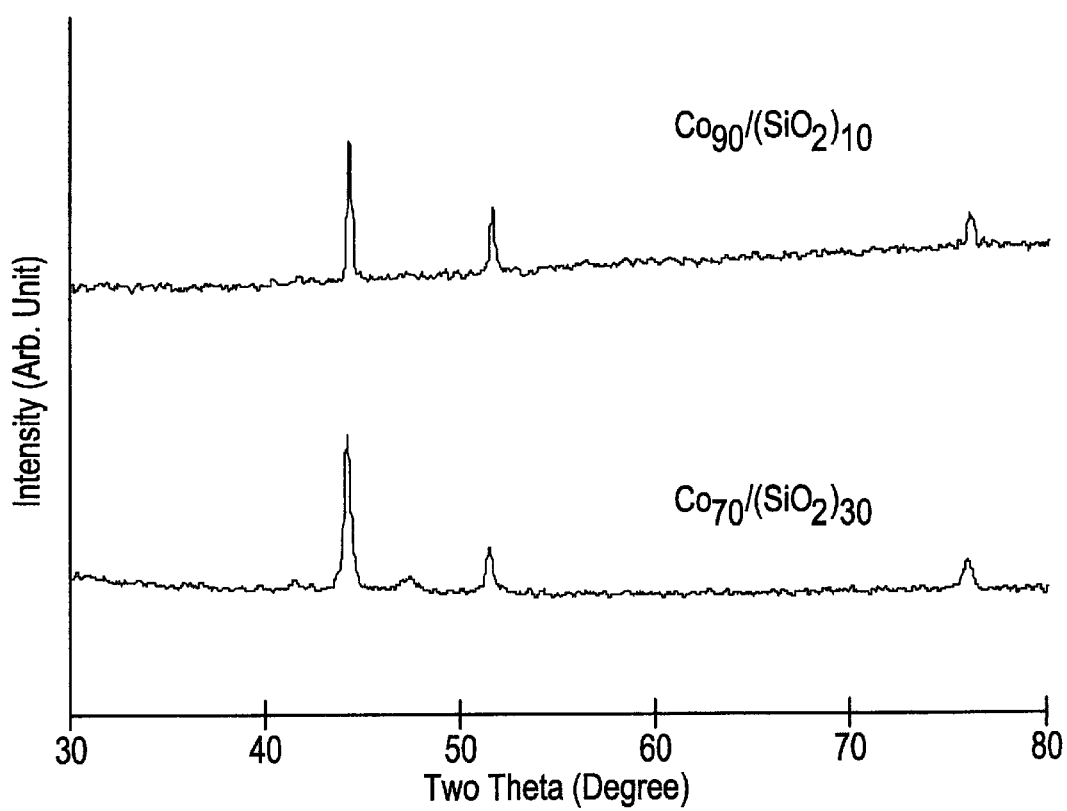
FIG. 2 is X-ray diffraction pattern showing fcc phase of the $Co_{70}/(SiO_2)_{30}$ and $Co_{90}/(SiO_2)_{10}$ nanostructured composites.
Figure 3:
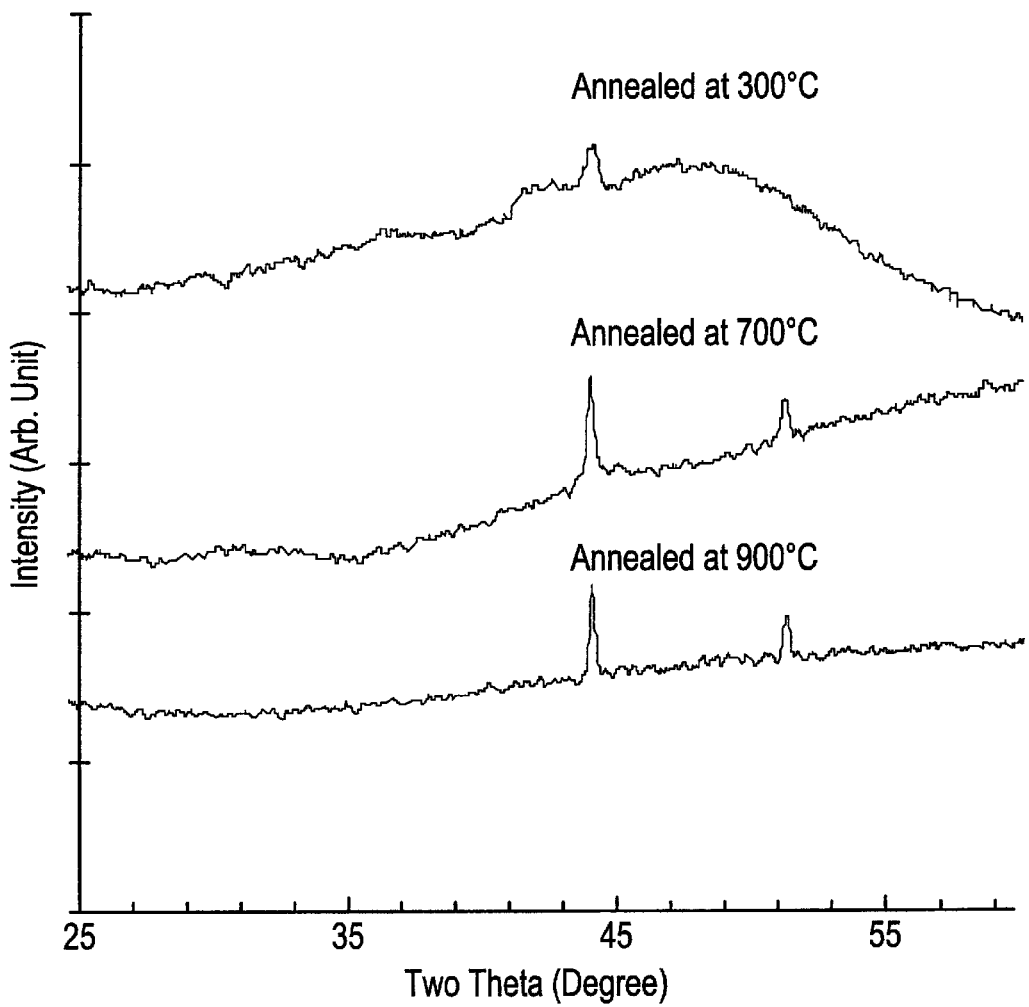
FIG. 3 is X-ray diffraction patterns showing the $Co_{50}/(SiO_2)_{50}$ nanostructured composite annealed at different temperatures in $H_2$.

XRD analysis: In order to obtain soft magnetic properties, the Co particle should possess an fcc crystal structure. FIG. 2 shows the XRD patterns of n-Co$_{70}$/(SiO$_2$)$_{30}$ and n-Co$_{90}$/(SiO$_2$)$_{10}$ particles. The XRD spectra exhibit only the fcc Co phase, with a strong amorphous background due to the presence of an amorphous silica phase. FIG. 3 shows the XRD pattern of n-Co)$_{50}$/(SiO$_2$)$_{50}$ samples obtained by annealing the precomposites in H$_2$ at various temperatures. Only the fcc Co phase was revealed at all temperatures. There exist no diffraction lines for SiO$_2$, confirming its amorphous structure. Preliminary evaluation of Co particle size using x-ray broadening revealed that the average Co grain size is about 30 nm, and there is not a significant change of grain sizes at these annealing temperatures.

Figure 4:
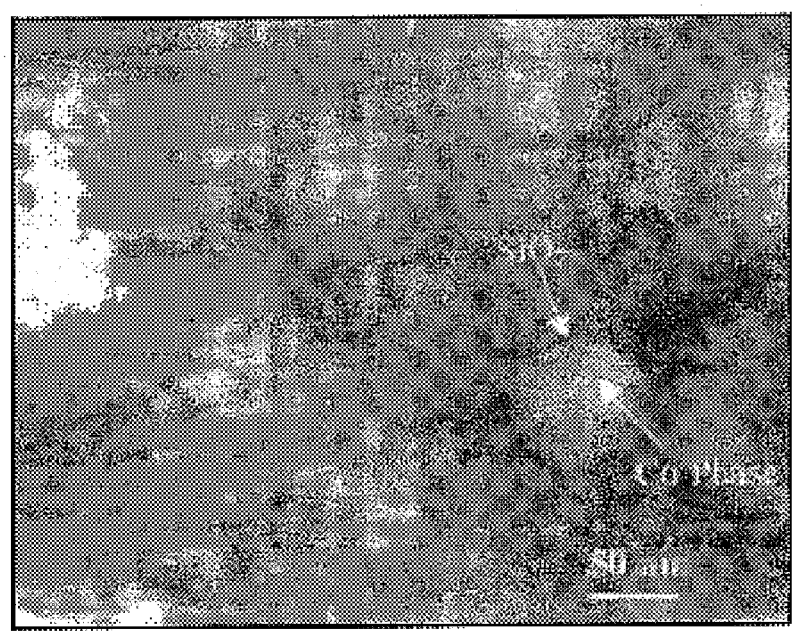
FIG. 4 is a typical transmission electron microscope (TEM) micrograph showing a two-phase material wherein amorphous $SiO_2$ films are coated on the surface of Co nanocrystals.

TEM observation: A typical TEM bright field image for the synthetic n-Co$_{50}$/(SiO$_2$)$_{50}$ is shown in FIG. 4. The TEM studies revealed that the synthetic nanostructured composite is a two-phase material, where nanostructured particles of Co are coated with a thin film of silica. The Co phase has an average particle size of about 30 nm using an image size analysis technique. Selected area electron diffraction experiments indicated that the Co particles are fcc nanocrystals, where the matrix silica phase is amorphous.

Figure 5A:
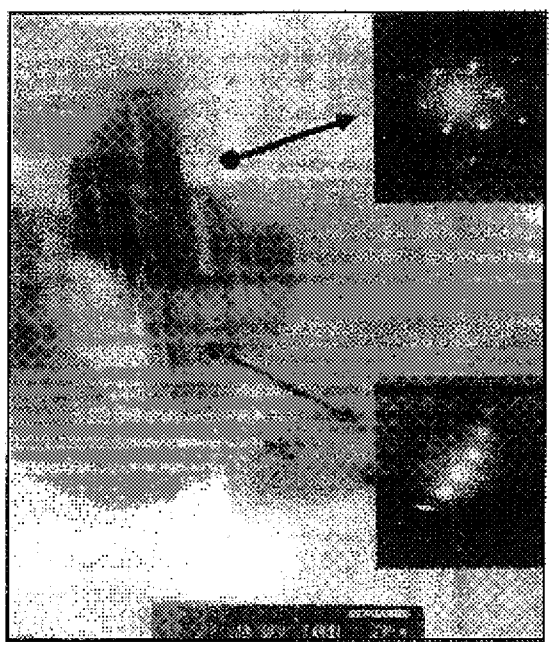
FIG. 5 is a typical TEM micrograph showing (a) a TEM image with microbeam diffraction showing local regions of microstructure of (1) [110] alpha-$SiO_2$, and (2) fcc [111] Co, and (b) TEM image of the interface between Co and $SiO_2$ showing the existence of dislocations.
Figure 5B:

In order to study the microstructure in detail at the nanometer level, localized regions at the Co/silica interface have been studied using a microbeam diffraction technique. The diffraction beam was reduced to approximately 10 nm in size and diffracted at the area of interest. Two phases were found in localized regions, including fcc Co and [□]γ-phase $SiO_2$, as shown in FIG. 5a. It should be noted here that the majority of the $SiO_2$ coating is amorphous, as indicated in the XRD and other selected large area diffraction techniques. Many twins are observed inside the Co nanostructured particles. High resolution TEM also revealed the existence of few dislocations in the interface between fcc Co and amorphous $SiO_2$ coating, as shown in FIG. 5b.

Figure 6:
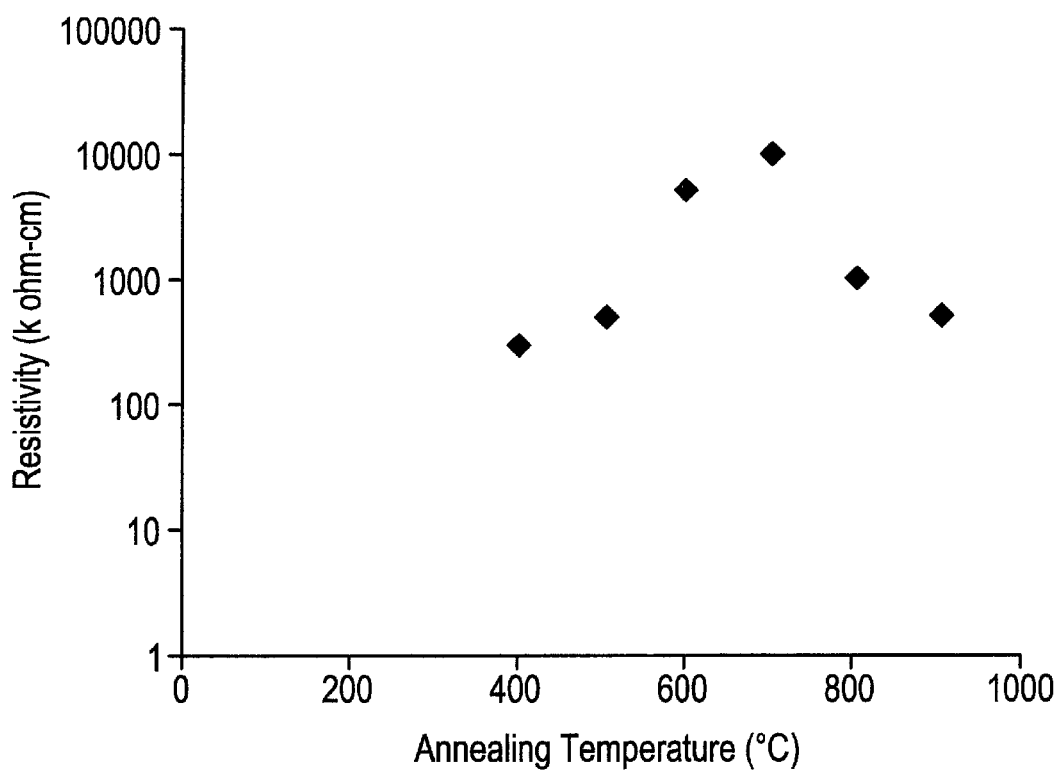
FIG. 6 is a graph illustrating resistivity of a $Co/SiO_2$ nanostructured composite as a function of hydrogen annealing temperature.

Resistivity of the n-Co/$SiO_2$ nanostructured composite powder: The synthetic powder was pressed into a pellet using a hydraulic press. Plate electrodes were pressed on both surfaces of the disc, and then electrical resistance was measured. From the area and the thickness of the disc, the resistivity of the sample was obtained. FIG. 6 shows the variation of the resistivity of n-$Co_{50}(SiO_2)_{50}$ as a function of $H_2$ annealing temperature. It reveals that for a sample annealed at about 700° C., its resistivity can reach as high as $10^7$ Ω-cm, which is $10^{13}$ times greater than that of metallic alloys and is 10 times greater than that of ferrites. The resistivity of the n-Co/$SiO_2$ is dependent on the synthesis conditions, especially on the $H_2$ annealing temperature. When the annealing temperature is too high, $SiO_2$ may gradually crystallize to form separate particles instead of coating the Co particles as a continuous film, resulting in a dramatic decrease in resistivity.

Figure 7A:
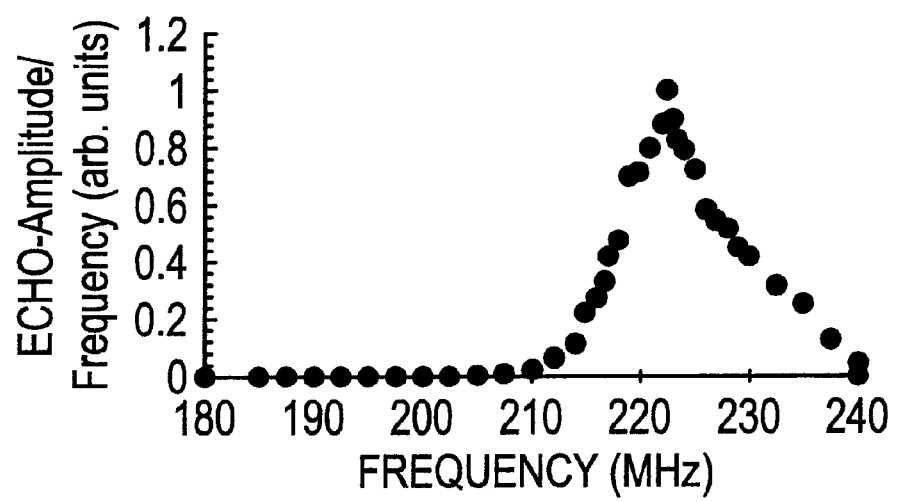
FIG. 7 is a typical $^{59}Co$ NMR spectrum of $Co/(SiO_2)$ nanostructured composite annealed (a) at 400° C. in $H_2$ showing all the Co nanostructured particles are in a fcc single domain state and no Si atoms in the Co lattice, and (b) at 900° C. in $H_2$ showing Co particle being in a fcc single domain state, but some Si atoms having entered the Co lattice.
Figure 7B:
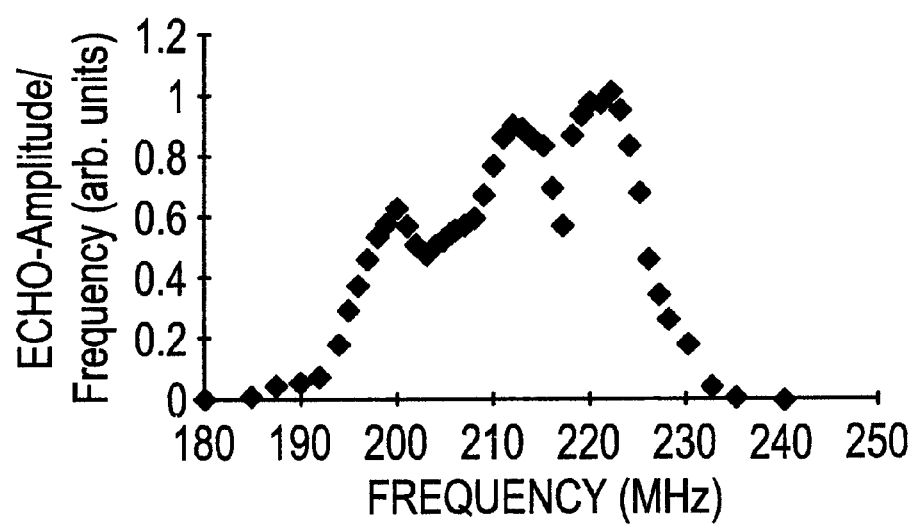

NMR experiments. $^{59}$Co spin-echo NMR experiments were carried out at 4.2 K using a Matec 7700 NMR. FIGS. 7a and 7b show the $^{59}$Co NMR spectra of n-$Co_{50}/(SiO_2)_{50}$ annealed at 400° C. and 900° C., respectively. For the sample annealed at 400° C., the NMR spectrum consists of a single peak centered at 223 MHz. This means the Co particle is smaller than 75 nm and has single domain structure. The very broad spectrum is also an indication of the smallness of the particle. For the sample annealed at 900° C., instead of the main peak at 223 MHz, there are two satellites centered at 211 and 199 MHz, which correspond to the Co atoms having 1 and 2 Si atoms, respectively, as nearest neighbors. This demonstrates that Si enters the Co lattice when annealing at temperatures higher than 900° C.

These experiments have further shown that the size of the as-synthesized n-Co/$SiO_2$ particles, and their crystalline and magnetic structures meet the goals for a soft magnetic material. In the preparation of n-Co/$SiO_2$ particles, the final annealing (in $H_2$ gas flow) is an important step. The chemical reaction process should be fully completed so as to reduce all of the Co ions into metallic Co. From this consideration, a higher annealing temperature might be favored. On the other hand, however, it is necessary to avoid Si atoms entering the Co lattice as the existence of the non-magnetic Si atoms in a Co particle degrade magnetic properties. Based on these experiments, the best annealing temperature of n-Co/$SiO_2$ appears to be about 700° C.

B. Static Magnetic Properties of n-Co/$SiO_2$ Powder

A Quantum Design SQUID magnetometer was employed to characterize the static magnetic properties of the synthetic $Co_x/(SiO_2)_{100-x}$ nanostructured composite at 10 K and 300 K. FIG. 8 shows the saturation magnetization of n-$Co_x/(SiO_2)_{100-x}$ as a function of the Co volume fraction. The solid diamonds represent the measured saturation magnetization for each Co volume fraction, and the squares represent the theoretical calculation. The very good consistency between the measured value and the calculated value indicates that the synthesis reaction is complete.

Figure 11:
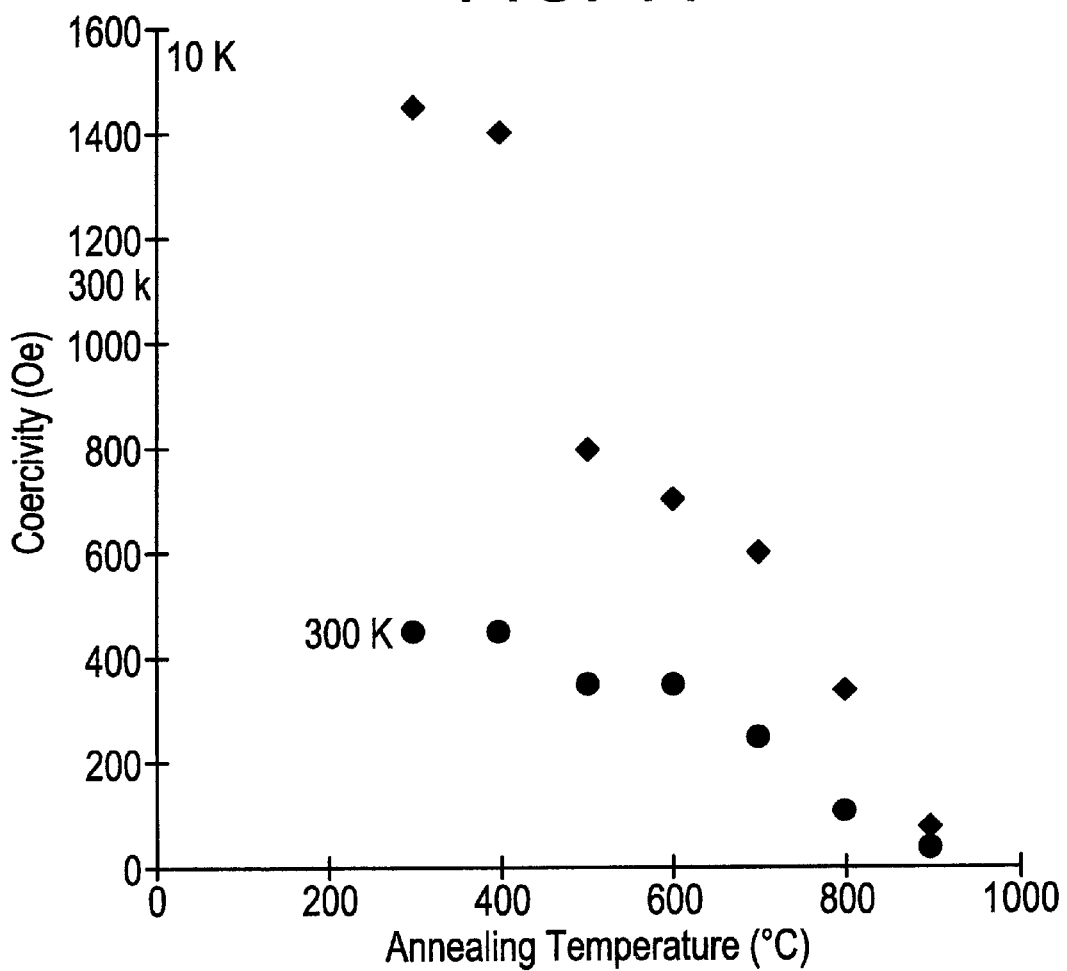
FIG. 11 illustrates the variation of coercivity of $n-Co/SiO_2$ with annealing temperature measured at 10 K and 300 K.

Static magnetic properties for a material are characterized by its magnetization curve (from which saturation magnetization is obtained) and hysteretic loop (from which coercivity is obtained). FIG. 9 shows a typical magnetization curve and hysteresis loop, from which the saturation magnetization and coercivity are obtained. FIG. 10 shows the variation of saturation magnetization of n-$Co_{50}(SiO_2)_{50}$ with $H_2$ annealing temperature. When the material is annealed at 300° C., the saturation magnetization is only 5,655 G due to an incomplete reaction, while annealing at temperatures above 700° C., the saturation magnetization can be 10,681 G. For soft magnetic applications, low coercivity with high magnetization saturation is desirable. FIG. 11 shows the coercivity of the Co/$SiO_2$ nanostructured composite as a function of $H_2$ annealing temperature. A drastic decrease of the coercivity with increasing $H_2$ annealing temperature is clearly demonstrated. This behavior is mainly due to the variation of the Co particle size with annealing temperature. Annealing at lower temperature, the particle size is smaller (e.g., about 10 nm), resulting in a large coercivity, while annealing at a higher temperature produces larger Co particles that have lower coercivity.

The coercivity and particles size of the Co particles in the nanostructured composite can be adjusted by adjusting the $H_2$ annealing temperature. Optimal magnetic properties appear at $H_2$ annealing temperatures of higher than about 600° C.

Fabrication of Magnetic Nanostructured Composite Toroidal Cores.

The above synthetic Co/$SiO_2$ nanostructured composite powders were consolidated to produce toroidal cores for high frequency bulk applications, by (i) preparation of ready-to-press powders, (ii) consolidation of the ready-to-press powder into a green compact, (iii) toroid sample fabrication, and (iv) low temperature annealing.

First, the synthetic Co/$SiO_2$ was transferred to a beaker that contained wax (paraffin) in alcohol. After thorough mixing using mechanical stirring, the alcohol was slowly evaporated by heating, resulting in the uniform mixing of powder and wax, where the wax was coated on the surface of the composite particles.

The next step was to press the powder into consolidated form, followed by subsequent breaking of the consolidated bulk into fragments using a mortar and pestle. Using a milling technique, the corners of the fragments were trimmed off, resulting in highly flowable dense particles.

Green compact preparation was accomplished using a hydraulic press. Experimentally, the ready-to-press powder was transferred into a die, and pressed into a pellet under a load of about 200 MPa.

The pressed pellet was then machined into a toroid-shaped geometry. The sizes of the toroids were 1.5 cm in outer diameter, 0.5 cm in inner diameter, and 0.5 cm in height. A coil of four turns was wound along the circular direction of the toroid to form an inductor.

For consolidation, the as-fabricated toroids were then transferred into an environmental furnace for heat treatment. Heat treatment was performed at two stages: 500° C., and 700° C. in $H_2$. The 500° C. treatment was for about 0.5 hours, which allowed the materials to be dewaxed, resulting in a pure composite in the pellet. The 700° C. treatment was performed over several hours, which allowed the sintering of the samples.

The consolidation of nanostructured composite materials is a critical step towards development of an optimal soft magnetic material. An isolated nanostructured composite particle possesses very high anisotropy due to its large surface anisotropy and demagnetizing effect. For nanostructured composite materials, the soft magnetic properties come from the intergrain interaction, mostly due to the exchange coupling of the neighboring Co particles. The intergrain interaction tends to average the anisotropy of each individual particle, resulting in much reduced anisotropy and, consequently, higher permeability. A critical parameter, the exchange coupling length, is the distance within which the magnetic moments of the two particles can be coupled. For Co, the exchange length is estimated to be about 20 nm. Therefore, the particles have to be consolidated to achieve separation of the neighboring particles, which is less than the exchange length.

Low temperature consolidation using a sintering aid. Due to the high melting temperature of $SiO_2$, the solid-phase sintering of the $SiO_2$-coated particles is at a very high temperature. However, the addition of a small amount of $Na_2O$ into the $SiO_2$, which may form $Na_2SiO_3$, significantly reduces the sintering temperature down to about 450° C. Thus $Na_2SiO_3$-coated particles can be consolidated by sintering at about 400 to about 500° C. Since $Na_2SiO_3$ has similar electrical properties to that of $SiO_2$, the addition of $Na_2O$ will not change the insulating behavior of the $SiO_2$ layer. Nanostructured $Co/SiO_2$ particles with various amounts of $Na_2O$ sintering additive have been synthesized and sintered. The results show that the addition of a $Na_2O$ additive to the nanostructured composite can reduce the sintering temperature of the $Co/SiO_2$ system down to about 500° C., with a compact density of 83%. Further densification of the compact can be achieved up to 90% once the composition of the additive is optimized.

Densifying the pre-sintered compacts by a Hot Isostatic Press ("HIP") process was performed at American Isostatic Press, Inc. (Columbus, Ohio). Initial trials indicated that the pre-sintered compact can be densified by HIP to a density >90%.

Properties of Consolidated Nanostructured Composite Toroidal Cores

A. Dynamic Magnetic Property Measurements

Complex permeability $\mu=\mu'-\mu''$ is the most important parameter for characterizing the magnetic properties of magnetic materials for high frequency applications. In this expression, $\mu'$ is a measure of the softness of the magnetization process in an alternating magnetic field, and $\mu''$ is a measure of the loss of the energy in the magnetization process. The ratio $\mu'/\mu''=Q$ is called the Q factor, a parameter extensively used in industry.

High frequency applications require magnetic materials with large $\mu'$ and large Q, while keeping $\mu''$ minimal. The currently used ferrites, including spinel ferrites ($(Ni,Zn)_2Fe_4$) and hexagonal ferrites ($Co_2Z$, where $Z=Ba_3Me_2Fe_{24}O_{41}$), have a $\mu'$ value <15, and the cutoff frequencies (the frequency at which $Q \leq 1$) are less than 500 MHz. One useful proposed target is to develop a material with $\mu' \geq 30$ up to 500 MHz, and a cutoff frequency $\geq 11000$ MHz. This frequency region is most appropriate for telecommunications. Another desirable target includes the region 400–1000 kHz. The complex permeability experiment is critical for the $Co/SiO_2$ nanostructured composite materials for high frequency (>1 MHz).

The complex impedance, $Z=R_x+j\omega L_x$, of the inductor was measured using an HP impedance meter for frequencies ranging from 10 Hz–13 MHz and an RX impedance bridge for frequencies from 20–250 MHz. The following expressions were used to calculate $\mu'$, $\mu''$, and Q:

$$\mu' = \frac{D}{0.4N^2 S} L_x \quad (1)$$

$$\mu'' = \frac{D}{0.4N^2 S} \frac{R_x}{\omega} \quad Q = \mu'/\mu'' \quad (2)$$

wherein:
D is the mean diameter of the toroid;
N is the number of turns of the coil wound on the toroid; and
$\omega$ denotes angular frequency.

B. Permeability Comparison of $Co/SiO_2$ Nanostructured Composite and Ni Ferrite.

Figure 12A:
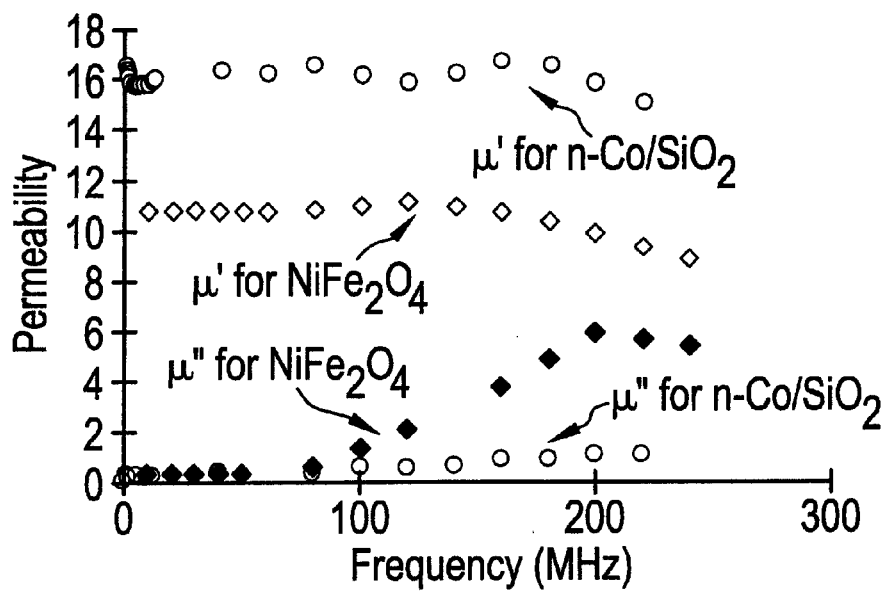
FIG. 12 illustrates the frequency dependence of (a) complex permeability $\mu'$ and $\mu''$ for $n-Co/SiO_2$ compared with that for $NiFe_2O_4$ ferrite, and (b) quality factor (Q) for $n-Co/SiO_2$ compared with that for $NiFe_2O_4$ ferrite.

FIG. 12a shows the frequency dependence of $\mu'$ and $\mu''$ for the toroidal sample measured using n-$Co_{50}/(SiO_2)_{50}$. Much better high frequency performance is obtained for $\mu'$ and $\mu''$ for the n-$Co/SiO_2$ compared to the conventional $NiFe_2O_4$ ferrite. For the n-$Co/SiO_2$ sample, $\mu'$ is about 17, and it possesses a very flat frequency response curve from 10 Hz up to the highest measured frequency of 240 MHz, while $\mu\mu$ stays close to zero for all frequencies. For the conventional $NiFe_2O_4$ ferrite, $\mu'$ stays flat below 100 MHz, but gradually drops beyond this frequency, while $\mu''$ increases rapidly when the frequency is larger than 100 MHz.

Figure 12B:
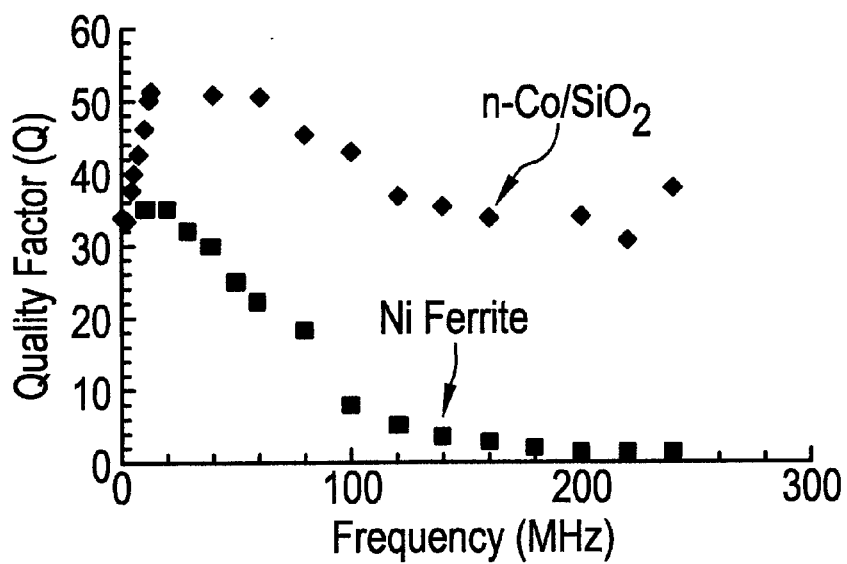

Meanwhile, the value of the quality factor Q (see FIG. 12b) is greater than 40 (up to 240 MHz), while the quality factor for conventional ferrite is only about 2 when the frequency is larger than 100 MHz. These results demonstrate that the high frequency magnetic properties of the n-$Co_{50}/(SiO_2)_{50}$ composite are better than those of $(Ni,Zn)_2Fe_4$ and $Co_2Z$ ferrites for the region above 100 MHz. These results, although not applicable to power transmission, are of great interest for telecommunications.

C. Permeability of $Co/SiO_2$ Nanostructured Composite and Known Materials.

Figure 13:
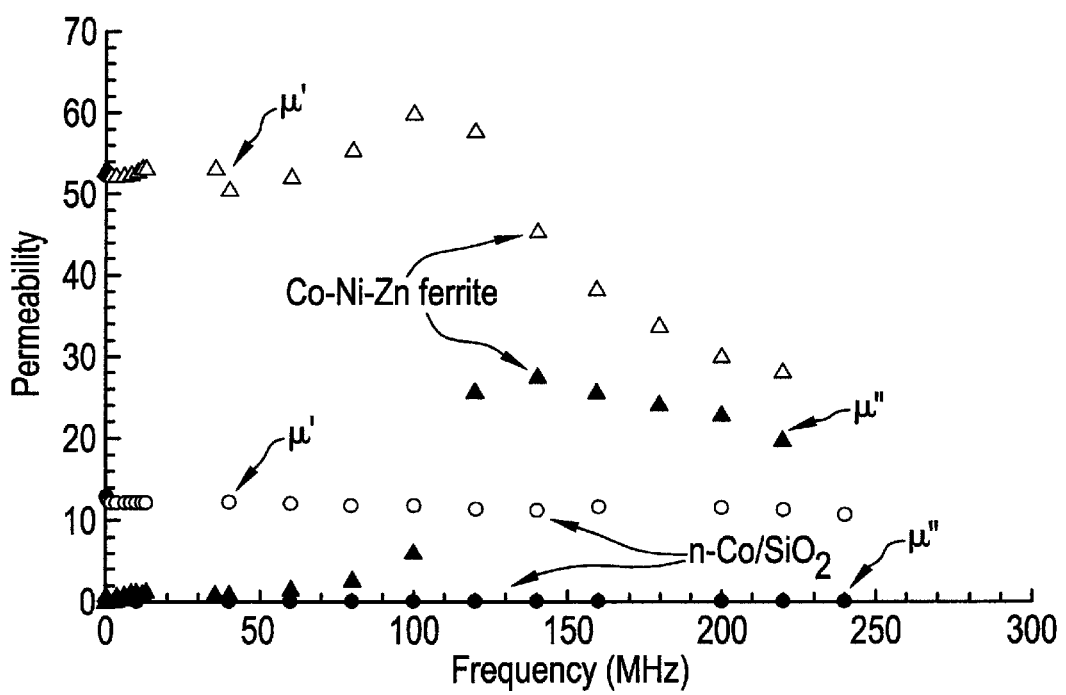
FIG. 13 shows the frequency dependence of complex permeability $\mu'$ and $\mu''$ for $n-Co/SiO_2$ compared with that for Co—Ni—Zn ferrite.

FIG. 13 shows a comparison between the n-$Co/SiO_2$ and commercial Co—Ni—Zn ferrite. In contrast with a flat frequency for the n-$Co/SiO_2$, the $\mu'$ for the Co—Ni—Zn ferrite drastically decreases and its $\mu''$ increases with increasing frequency beyond 100 MHz. Therefore, this is another example of superior performance in our magnetic nanostructured composite compared to a conventional material with a different composition. Generally, a material is not useable if the quality factor is below 10. For the Co—Ni—Zn ferrite, it is 100 MHz as shown in FIG. 13.

Figure 14:
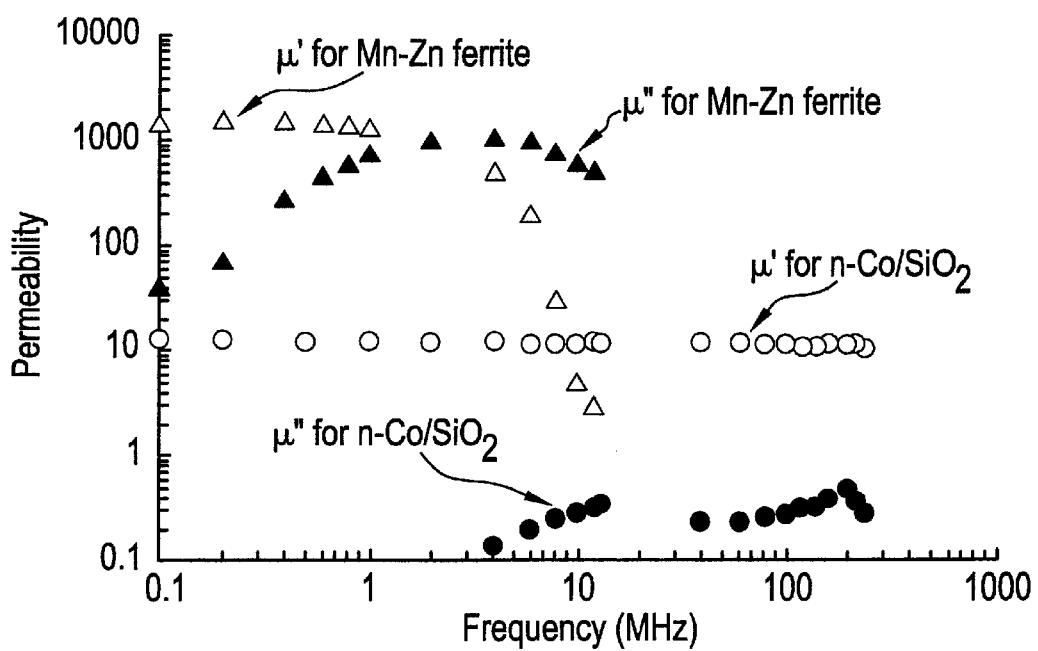
FIG. 14 illustrates the frequency dependence of complex permeability $\mu'$ and $\mu''$ for $n-Co/SiO_2$ compared with that for Mn—Zn.

FIG. 14 shows a comparison between the n-$Co/SiO_2$ and a Mn—Zn ferrite, MN8cx (Ceramic Magnetics). This ferrite is designed for power converters operating in the range of 0.5–2 MHz. It is one of the best soft magnetic materials for high power applications at elevated frequencies. As shown in the figure, at 2 MHz the Q value for MN8cx is already less than 1. As can be seen from FIG. 14, nanostructured composite materials will have much better frequency response up to at least 240 MHz (measurement limit), where the Q value is still 40.

Figure 15:
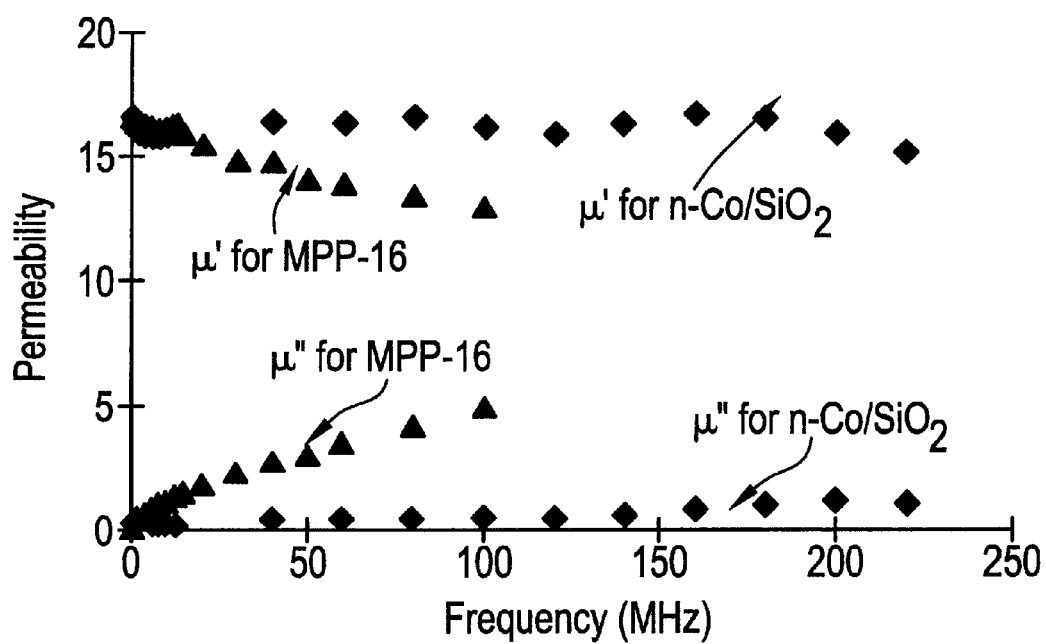
FIG. 15 illustrates the frequency dependence of complex permeability $\mu'$ and $\mu''$ for $n-Co/SiO_2$ compared MPP-16 PERMALLOY™.

FIG. 15 is a comparison of the permeability frequency dependence between the nanostructured $Co/SiO_2$ and a conventional MPP-16 (PERMALLOY) core, supplied by NASA. The MPP-16 is made of micron-sized Mo-PERMALLOY particles embedded in an insulating matrix so as to increase its resistivity and, consequently, reduce the eddy current at elevated frequencies. This type of material can be referred to as a microcomposite. Normally, the smaller the particle size, the lower the loss and, then the higher the usable frequency. However, this causes severe reduction of the permeability. The bulk Mo-PERMALLOY possesses a permeability of $10^4$ to $10^5$, but as shown in FIG. 15, $\mu'$ is only 16 for the MPP-16 microcomposite.

The two materials have almost the same $\mu'$ at low frequency. The $\mu'$ and $\mu''$ permeability frequency response for the nanostructured composite is essentially flat up to the highest measurement frequency 240 MHz. For the MPP-16, $\mu'$ starts to decrease, while $\mu''$ increases rapidly from 1 MHz. At 100 MHz, a 20% decrease is observed, and the Q value is smaller than 10 beyond 15 MHz. This result clearly demonstrates the advantage of nanostructured composite magnetic materials over the conventional microcomposite materials.

Synthesis of Fe—Ni/$SiO_2$ Nanostructured Composite Powders.

The principal aspects involved in fabricating Fe—Ni-based nanostructured composites are the same as for fabricating Co/$SiO_2$ nanostructured magnetic composites. The precursor materials in the synthesis include iron nitrate, nickel nitrate, tetraethoxysilane, glucose, and deionized water. The synthesis steps are similar to the Co/$SiO_2$ nanostructured composite system. Detailed synthesis steps are illustrated below:

Starting precursors of tetraethoxysilane, iron nitrate, nickel nitrate, and glucose were dissolved in DI water. This solution was stirred to obtain a homogenous solution.

The precursor solution was converted into a precomposite powder by heating the precursor solution 120–150° C., under vigorous stirring to prevent possible precipitation of any elements.

For conversion of precomposite into Fe—Ni/$SiO_2$ nanostructured composite, the precomposite powder was transferred to an environmental furnace (modified Thermolyne). The powder was first heated to 500° C. in open air for 0.5 hours. The purpose of this heat treatment is to burn off excess carbon in the precomposite powder. After the reaction, Fe, Ni, and Si existed in the form of amorphous oxides, namely, iron oxide, nickel oxide, and silica.

The oxide forms of the precomposite were then converted into Fe—Ni/$SiO_2$ nanostructured composite under a reducing atmosphere in $H_2$. The system was then purged and $H_2$ gas was introduced immediately after the oxidation reaction at 500° C. The reduction experiments were performed at various temperatures from 300 to 900° C. ($H_2$ flow of 2 liters/min). All these temperatures produced Fe—Ni/$SiO_2$ nanostructured composite powders.

For surface passivation, after the hydrogen reduction is complete, the system was purged with $N_2$ gas for 20 minutes to de-activate the Fe—Ni surface. The system was then cooled down in $N_2$. Before exposing to air, droplets of mineral oil were sprinkled onto the powder surface and allowed enough time for oil diffusion, while the reactor is purging with $N_2$. Excess oil was then washed with hexane.

Synthesis of Fe/$NiFe_2O_4$ Nanostructured Composite Powders.

Chemical precursors of (Fe($C_6H_5O_7$)$3H_2O$), 145.4 g nickel nitrate (Ni($NO_3$)$_2 6H_2O$) and 64.36 g citric acid were dissolved in 1000 ml of deionized water under stirring to obtain a homogenous solution mixture. The mixture was dried in oven at 40° C. overnight and crushed pass 60 mesh screen. The crushed powder was calcined at temperatures from 200 to 900° C. for 2 hours in air to remove carbon and form nanostructured $NiFe_2O_4$.

Characterization showed that for calcinations below 700° C., the obtained $NiFe_2O_4$ nanoparticles have diameters of less than 15 nm, and above 700° C., the particle size of the ferrite can be varied from 10 to 100 nanometers.

The obtained $NiFe_2O_4$ was then mixed mechanically with Fe nanoparticle or ceramic ($SiO_2$ or $B_2O_3$) coated Fe nanoparticles to obtain a Fe/$NiFe_2O_4$ nanocomposite powder. The mixing procedure for obtaining an 80%Fe/$SiO_2$+20%$NiFe_2O_4$ is as follows.

124.5 g N—$NiNe_2O_4$ was mixed with 579.0 g Fe/$SiO_2$ (Fe to $SiO_2$ ratio is 70 to 30) by ball milling in alcohol for 24 hours. The milled the slurry was dried in an oven at 30° C. for 24 hours to obtain the Fe/$NiFe_2O_4$ nanocomposite.

Synthesis of Fe/$SiO_2$ Nanostructured Composite Powders.

291.258 g Fe($NO_3$)$_3 9H_2O$, 37.30 g Si($C_2H_5O$)$_4$, and 50 g of glucose were dissolved in 500 ml of ethanol in a 2 liter glass beaker. The beaker was than placed on a hot plate at 70° C. and stirred with a mechanical stirrer until the material was completely dissolved. The material gradually formed into a gel after heating for two hours. After the experiment was complete the material was heated in an oven at 100° C. to obtain a Fe—Si—O precomposite powder complex.

The precomposite powder was then oxidized in a controlled oxygen/nitrogen environment at 300° C. for 4 hours in air and then reduced using $H_2$ to obtain Fe/$SiO_2$ nanocomposite powders at 400–600° C. in a furnace. The obtained nanocomposite has an alpha-phase Fe with particle size ranging from 20 to 80 nanometers, while the $SiO_2$ phase is amorphous matrix and uniformly coated onto the Fe nanoparticle surface.

Synthesis of Co/Polymer Nanostructured Composite Powders.

The preparation of Co/polymer consisted of thermally decomposing cobalt carbonyl in organic solvent containing a polymer as a stabilizing medium. Experimentally, 2.4 grams of $Co_2(CO)_8$ was weighed and poured into a three-neck 100 ml round bottom flask (fitted with a reflux condenser, connected to vacuum lines and flushed with nitrogen). A total of 50 ml of toluene was used. A portion of toluene was added with an injection syringe and the mixture was stirred under nitrogen. 0.525 grams of polystyrene with monocarboxy terminated (Scientific Polymer Products, MW 13,000) was then dissolved in the remaining toluene solution and added to the reaction vessel. The temperature of the toluene was then raised to 130° C., and refluxed under nitrogen for 24 hours. The resultant material comprises black Co colloidal particles uniformly distributed polymer matrix, or Co nanoparticles coated with a polymer film. The Co/polymer system is stable metal/polymer nanocomposite. X-ray diffraction showed the resultant material has face-center-cubic Co phase, with average particle size less than 10 nm. High resolution TEM analysis indicated that the Co is between 1 to 15 nanometers in size, surround by amorphous material (probably polymer).

Other polymers have also been used to fabricate Co/polymer nanocomposites, including polystyrene (MW 280,000, Density 1.047, $T_g$ 100° C.); polystyrene sulfonated sodium salt (1.7 Na$^+$SO$_3^-$ per 100 styrene, $M_n$ 100,000 and MW 200,000); poly(styrene-co-acrylonitrile) MW about 165,000, 25 wt % acrylonitrile).

Fabrication of Magnetic Nanostructured Composite Toroidal Cores.

The synthetic Co/$SiO_2$, Co/polymers, Fe—Ni/$SiO_2$, Fe/$SiO_2$, and Fe/$NiFe_2O_4$ nanostructured composite powders have been consolidated to produce toroidal cores for high frequency bulk applications. The consolidation step is similar to the procedures described above, i.e., (i) preparation of ready-to-press powders, (ii) consolidation of the ready-to-press powder into a green compact, (iii) toroid sample fabrication, and (iv) low temperature annealing.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A soft magnetic bulk consolidated material comprising magnetic particles, wherein each particles is surrounded by an insulating layer, wherein the magnetic particles have grain sizes from 1 to 100 nanometers, and wherein the magnetic particles are separated by 1 nanometer to 100 nanometers.

2. The composition of claim 1, wherein the magnetic particles comprise a magnetic component selected from the group consisting of transition metals, Fe, Ca, Ni, Mn, transition metal intermetallic alloys, Fe—Ni, Fe—Co, Co—Ni, Fe—B, Fe—N, Fe—Zr, Fe—Si, Fe—Si—B, Fe—Zr—B, Fe—P—B, Mn—Zn, transition metal-rare earth alloys, Fe—Nb, Fe—Sm, and mixtures comprising at least one of the foregoing.

3. The composition of claim 1, wherein the insulating layer is a high dielectric ceramic or polymeric material.

4. The composition of claim 1, wherein the magnetic particle—particle separation is about 0.5 to about 50 nm.

5. The composition of claim 1, wherein the magnetic particle—particle separation is about 1 to about 20 nm.

6. A method for the formation of a magnetic composition, comprising:

fabricating a precomposite from a powder precursor composition;

forming magnetic nanostructured particles surrounded by a dielectric layer from a precomposite; and passivating the surface of the surrounded nanostructured particles.

7. A method for forming a consolidated bulk magnetic/insulator nanostructured composite, comprising:

preparing a ready-to-press nanostructured composite powder comprising a nanostructured metal core and a dielectric layer, consolidating the ready-to-press powder into a green compact;

shaping the green compact; and annealing the shaped compact.

8. The composition of claim 1, as a component in power transformers, pulse transformers, filters, and chocks, inductors and linear transformers, linear applications, microwave antenna, rectenna, circular, as magnetic fluids and in refrigeration applications.

9. The composition of claim 1, wherein the magnetic particles comprise $Co/SiO_2$ particles, Fe—$Ni/SiO_2$ particles, $Fe/NiFe_2O_4$ particles, $Fe/SiO_2$ particles, or Co/polymer particles.

10. The method of claim 6, wherein the precursor composition is formed from a mixture of tetraethoxysilane, cobalt acetate, and glucose; a mixture of tetraethoxysilane, iron nitrate, nickel nitrate, and glucose; a mixture of $Fe(C_6H_5O_7)3H_2O$, nickel nitrate, and citric acid; or a mixture of iron nitrate, $Si(C_2H_5O)_4$, and glucose.

11. The method of claim 6, wherein fanning magnetic nanostructured particles surrounded by a dielectric layer comprises heating the precomposite to a temperature of 300 to 900° C. in the presence of $H_2$ gas.

12. The method of claim 6, wherein passivating the surface comprises cooling in $N_2$, sprinkling droplets of mineral oil on the surface, purging with $N_2$, and washing the excess mineral oil.

13. The method of claim 7, wherein shaping the green compact comprises producing a toroid-shape geometry.

14. The method of claim 7, wherein consolidating the ready-to-press powder into a green compact further comprises adding a sintering aid.

* * * * *